United States Patent [19]
Kim

[11] Patent Number: 6,133,855
[45] Date of Patent: Oct. 17, 2000

[54] APPARATUS AND METHOD FOR WARNING OF ILLEGAL STOPPING AND PARKING OF A CAR

[75] Inventor: Jae-Bong Kim, Ansan, Rep. of Korea

[73] Assignee: Hyundai Motor Company, Seoul, Rep. of Korea

[21] Appl. No.: 09/469,545

[22] Filed: Dec. 22, 1999

[30] Foreign Application Priority Data

Nov. 3, 1999 [KR] Rep. of Korea ............. 99-48348

[51] Int. Cl.[7] .................................. B60Q 1/48
[52] U.S. Cl. .................... 340/932.2; 340/425.5; 340/933; 340/988; 700/207; 700/300
[58] Field of Search ............... 340/932.2, 988, 340/995, 989, 905, 904, 933, 990, 425.5; 701/300, 200, 207

[56] References Cited

U.S. PATENT DOCUMENTS

| | | | |
|---|---|---|---|
| 5,343,237 | 8/1994 | Morimoto | 348/143 |
| 5,532,690 | 7/1996 | Hertel | 340/989 |
| 5,751,245 | 5/1998 | Janky et al. | 342/357 |
| 5,757,287 | 5/1998 | Kitamura et al. | 340/937 |

*Primary Examiner*—Jeffery A. Hofsass
*Assistant Examiner*—Son Tang

[57] ABSTRACT

An apparatus and method for warning illegal stopping and parking car, wherein a controller compares a position information of a vehicle provided by a GSP receiver with a position information of banned area stored in a data storage to discriminate whether the vehicle is parked or stopped according to an engine revolution and a vehicle speed detected while the vehicle is within the premise of the banned area, and to raise a warning when the vehicle is parked or stopped as a result of the discrimination, thereby assisting a driver in preventing an illegal parking or stopping in the banned area by mistake or on purpose.

12 Claims, 2 Drawing Sheets

APPARATUS AND METHOD FOR WARNING OF ILLEGAL STOPPING AND PARKING OF A CAR

BACKGROUND OF THE INVENTION

1. Field of the Invention

The present invention relates to an apparatus and method for warning illegal stopping and parking car, and more particularly to an apparatus and method for warning illegal stopping and parking car adapted to warn a driver against illegal stopping or parking when the driver's car stops or parks illegally at an area where illegal stopping or parking is prohibited.

2. Description of the Prior Art

Generally, there are some areas on a read where vehicles are not allowed to park or stop, by way of example, near the crossroad, sidewalk, hydrant and school zone.

When a vehicle stops or parks in an area where the vehicle is prohibited from stopping and parking, a driver of the vehicle is ticketed for fine. This act also blocks the traffic flow or results in accidents.

All the drivers therefore should observe the traffic laws and should not stop or park at an area where stopping or parking is prohibited according to the traffic laws in order to prevent blocking the traffic flow and occurring of accidents.

However, there is a problem in that signposts or marking posts for prohibiting the stopping or parking are not properly installed at most of the prohibitive areas, and even if the signposts are established, it is not easy for the drivers to recognize the signposts while driving, such that lots of stoppings and parkings are perpetrated by the drivers, not knowing the traffic laws well and not knowing the fact that the areas are prohibited from stopping or parking.

Still worse, cases are abundant where drivers perpetrate the illegal stoppings or pakrings habitually without having any guilty feeling when there is no regulator around, even though they know that the area where their vehicles are stopped or parked is a restricted zone therefore.

SUMMARY OF THE INVENTION

The present invention is disclosed to solve the aforementioned problems and it is an object of the present invention to provide an apparatus and method for warning illegal stopping and parking car adapted to warn a driver against illegal stopping or parking when a vehicle is illegally stopped or parked at a prohibited area, thereby assisting the driver in not stopping or parking on purpose or by mistake at the banned area.

In accordance with one object of the present invention, there is provided an apparatus for warning illegal stopping and parking car, the apparatus comprising:

a predetermined position information provider for detecting a current position of a vehicle to provide a position information of the vehicle;

running state detecting means for detecting a running state of a vehicle;

control means for discriminating whether the vehicle is stopped or parked at a prohibited area according to the current position and running state of the vehicle detected by the position information provider and the running state detecting means to output a control signal for warning against the illegal stopping or parking as a result of the discrimination; and a warning generator for raising a warning according to the control signal of the control means.

In accordance with another object of the present invention, there is provided a method for warning illegal stopping and parking car, the method comprising the steps of:

discriminating a position of a vehicle by way of predetermined position information providing means;

discriminating whether the current position of the vehicle discriminated by the position discriminating step is within a predetermined prohibited area;

detecting a running state of the vehicle when it is discriminated that the vehicle is stopped or parked in the prohibited area as a result of the position discriminating step; and raising a warning when the detected vehicle is stopped or parked in the prohibited area.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Embodiment of the present invention will now be described in detail with reference to the accompanying drawings.

Figure 1:
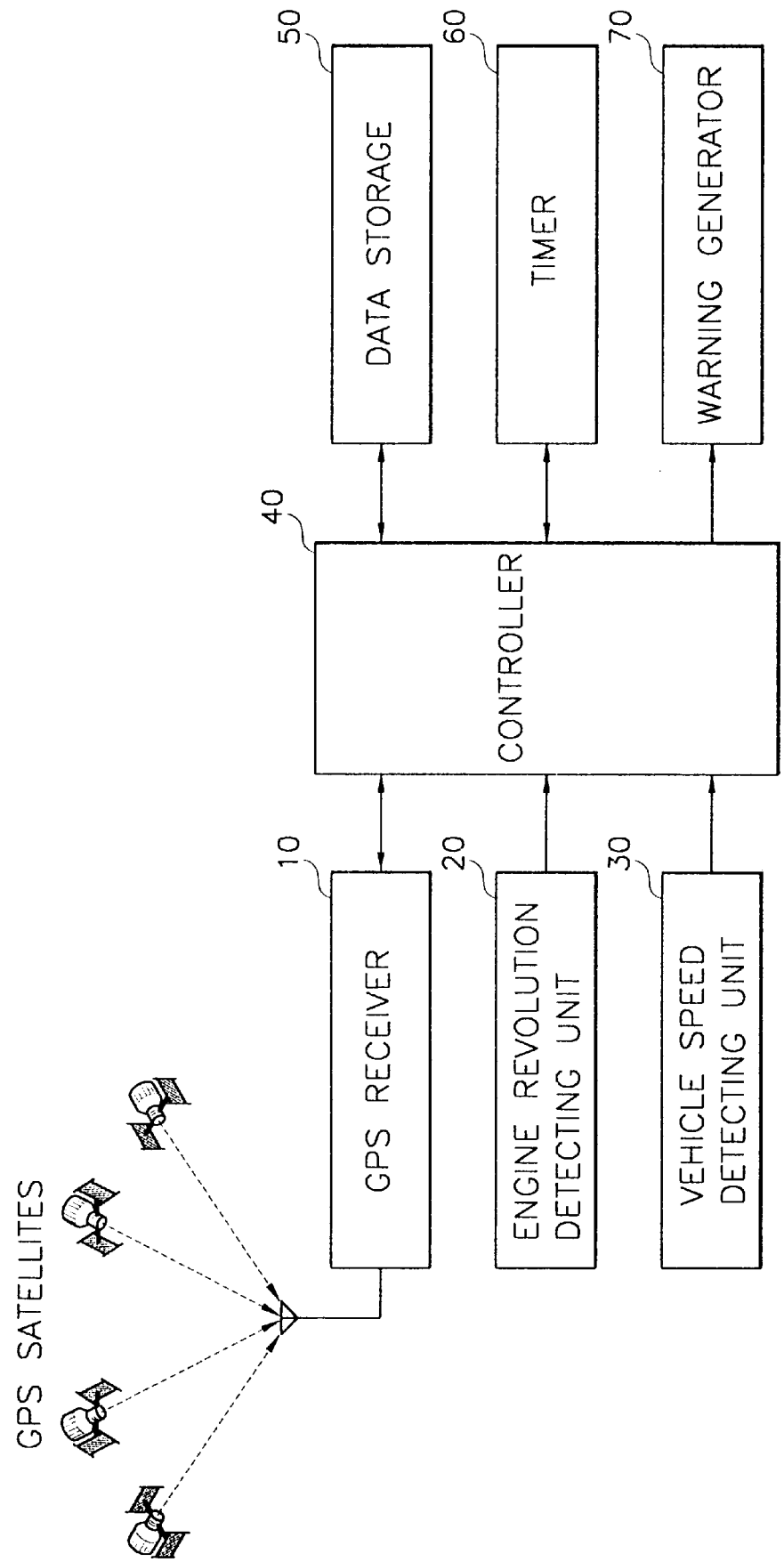
FIG. 1 is a schematic block diagram for illustrating a warring device against an illegal stopping or stopping vehicle according to the embodiment of the present invention.
Figure 2:
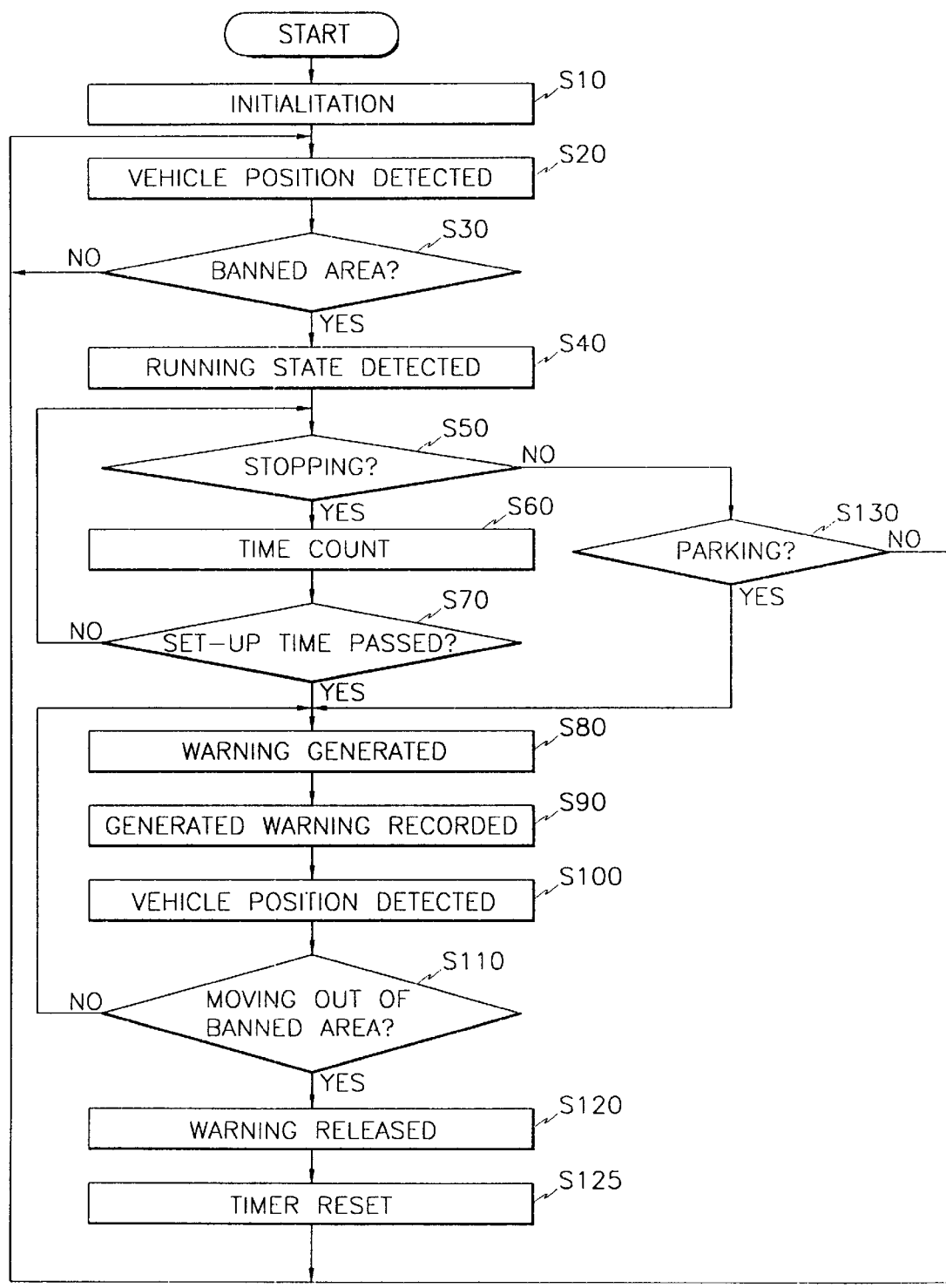
FIG. 2 is a flow chart for illustrating operational procedures of a control unit shown in FIG. 1.

FIG. 1 is a schematic block diagram for illustrating a warning device of an illegal stopping or parking vehicle according to the embodiment of the present invention, where a warning device against an illegal stopping or parking vehicle includes a Global Positioning System (GPS) receiver 10, an engine revolution detecting unit 20, a vehicle speed detecting unit 30, a controller 40, a data storage 50, a timer 60 and a warning generator 70.

The GPS receiver 10 in FIG. 1 serves to receive electronic waves transmitted from a plurality of GPS satellites to calculate a three dimensional position (latitude, longitude, altitude) of a vehicle according to time differences relative to the received waves and to provide a calculated position information to the controller 40.

The engine revolution detecting unit 20 detects an engine revolution of a vehicle to apply to the controller 40 a engine revolution signal corresponding to the detected engine revolution, and the vehicle speed detecting unit 30 detects an actual running speed of a vehicle to input to the controller 40 a vehicle speed signal corresponding to the detected vehicle speed, and, by way of example, a wheel speed sensor and the like may be used for detecting the rotating speed of a vehicle wheel.

The controller 40 detects a present position of a vehicle according to the vehicle position information provided from the GPS receiver 10 to discriminate whether the vehicle is parked or stopped according to the detected engine revolution signal and the detected vehicle signal when the detected current position is the banned area priorly set-up and established at the data storage 50, thereby generating a control signal for warning if the vehicle is discriminated to stop or park.

The data storage 50 serves to store a position information against the priorly set-up prohibited area and a record of warning, and the timer 60 counts the time according to the control signal from the controller 40 to provide the counted time information to the controller 40. The warning generator 70 raises a warning sound or displays a warning according to the control signal from the controller 40.

Now, operational procedures of the present invention thus constructed will be described in detail with reference to the accompanying drawings.

First of all, when a vehicle is ignited to thereby supply a power to the whole body of the vehicle from a generator, each part of the vehicle including the controller 40 is initialized.

The initialized GPS receiver 10 receives the waves transmitted from a plurality of GPS satellites to calculate a three-dimensional position (latitude, longitude, altitude) of the vehicle according to the time differences of received waves and to provide the calculated position information to the controller 40.

At the same time, the engine revolution detecting unit 20 detects the engine revolution of the vehicle to input to the controller 40 a detected engine revolution signal corresponding to the engine revolution of the vehicle, and the vehicle speed detecting unit 10 detects the vehicle speed and generates a vehicle speed signal corresponding thereto to apply same to the controller 40, step S10.

At this time, the controller 40 detects the present position of the vehicle according to the position information provided from the GPS receiver 10, step S20, and reads out the position information relative to the banned area priorly set up from the data storage 50 to discriminate whether the current position of the vehicle is within the prohibited area, step S30.

As a result of the discrimination at step S30, if the present position of the vehicle is not within the banned area, the controller 40 returns to step S20 to keep detecting the position of the vehicle.

As a result of the discrimination at step S30, if the present position of the vehicle is within the banned area, the controller 40 detects the engine revolution and speed of the vehicle according to the detected engine revolution signal input from the engine revolution detecting unit 20 and the vehicle speed signal applied from the vehicle speed detecting unit 30 to detect the engine revolution of the vehicle, step S40.

Successively, the controller 40 discriminates whether the vehicle is stopped according to the detected engine revolution and speed thereof, step S50. In other words, it can be discriminated that the engine is continuously rotating according to the detected engine revolution while the vehicle is stopped if the vehicle speed is zero.

As a result of the discrimination at step S50, if the vehicle is discriminated to have stopped, the controller 40 inputs to the timer 60 a control signal for counting the time, whereby the timer 60 counts the time according to the control signal from the controller 50 to provide to the controller 50 information about the counted time, step S60.

The controller 40 checks the timer information provided from the timer 60 to discriminate whether the time counted up to the present time has passed a predetermined set-up time (by way of example, approximately two minutes), step S70, and if the counted time has not passed the predetermined set-up time, flow returns to step S50 to check if the vehicle is maintaining a stopped state.

As a result of the discrimination at step S70, if the counted time has passed the predetermined set-up time, the controller 40 outputs a control signal for generating a warning to the warning generator 70, whereby the warning generator 70 generates a warning sound or display a warning according to the control signal from the controller 40, step S80.

Simultaneously, the controller 40 stores in the data storage 50 the information about the warned time and vehicle position, step S90.

Successively, the controller 50 re-detects the current position of the vehicle according to the position information input from the GPS receiver 10, step S100 and discriminates whether the vehicle has moved out of the banned area, step S110.

As a result of the discrimination at step S110, if the vehicle has not moved out of the banned area, the controller 40 returns to step S80 to keep generating the warning and releases the warning if the vehicle has moved out of the prohibited area, step S120.

At the same time, the controller 40 outputs a control signal for resetting the timer 60 which in turn resets time information counted previously by the reset control signal output from the controller, step S125.

Successively, the controller 40 returns to step S20 to keep performing the aforementioned controlling operation for generating a warning if the vehicle stops and parks in the banned area.

Meanwhile, as a result of the discrimination at step S50, if the vehicle is not stopped, the controller 50 discriminates whether the vehicle is parked according to engine revolution and vehicle speed detected at step S40, step S50. In other words, if the detected engine revolution is zero and vehicle speed is also zero, it can be discriminated that the vehicle is parked.

As a result of the discrimination at step S130, if the vehicle is discriminated not to park, flow returns to step S20, and if the vehicle is parked, flow proceeds to step S80 to generate a warning.

Control procedures henceforth is the same as those of the stopped vehicle.

Although the invention has been described in detail with reference to its presently preferred embodiment where a GPS receiver is used as a means for detecting a vehicle position, the present invention is not restricted to the above example but various modifications are possible by utilizing other position detecting means than the GPS receiver such as a position detecting device using a cellular phone and a position detecting device utilizing a gyro compass and a terrestrial magnetism sensor for detecting the position of the vehicle.

As apparent from the foregoing, there is an advantage in the apparatus and method for warning illegal stopping and parking car thus described according to the present invention in that a vehicle is discriminated of whether it is stopped or parked in the banned area to cause a warning to be generated if the vehicle is parked or stopped within in the banned area, thereby preventing a driver from stopping or parking illegally by mistake or on purpose.

What is claimed is:

1. An apparatus for warning of illegal stopping and parking of a car, the apparatus comprising:

a predetermined position information provider for detecting a current position of a vehicle to provide position information of the vehicle;

running state detecting means for detecting a running state of a vehicle;

control means for discriminating whether the vehicle is stopped or parked at a prohibited area according to the current position and running state of the vehicle detected by the position information provider and the running state detecting means to output a control signal for warning against the illegal stopping or parking as a result of the discrimination; and a warning generator for raising a warning according to the control signal of the control means.

2. The apparatus as defined in claim 1, wherein the position information provider is a GPS receiver for receiving electronic waves transmitted from a plurality of GPS satellites to calculate a current position of a vehicle.

3. The apparatus as defined in claim 2, wherein the control means comprises:

a control unit for performing the aforementioned operation and outputting operation of a control signal; and data storage for storing data for priorly set-up banned area and for a record of having raised a warning.

4. The apparatus as defined in claim 1, wherein the running state detecting means comprises an engine revolution detecting unit for detecting revolutions of an engine; and a vehicle speed detecting unit for detecting a vehicle speed, while the control means detects the running state of the vehicle according to the engine revolution and vehicle speed detected by the engine revolution detecting unit and the vehicle speed detecting unit.

5. The apparatus as defined in claim 4, wherein the control means comprises:

a control unit for performing the aforementioned operation and outputting operation of a control signal; and data storage for storing data for priorly set-up banned area and for a record of having raised a warning.

6. The apparatus as defined in claim 1, wherein the control means comprises:

a control unit for performing the aforementioned operation and outputting operation of a control signal; and data storage for storing data for priorly set-up banned area and for a record of having raised a warning.

7. A method for warning of illegal stopping and parking of a car, the method comprising the steps of:

discriminating a position of a vehicle by way of predetermined position information providing means;

discriminating whether the current position of the vehicle discriminated by the position discriminating step is within a predetermined prohibited area;

detecting a running state of the vehicle when it is discriminated that the vehicle is stopped or parked in the prohibited area as a result of the position discriminating step; and raising a warning when the detected vehicle is stopped or parked in the prohibited area.

8. The method as defined in claim 7 wherein the running state detecting step further comprises the steps of:

detecting a vehicle speed and an engine revolution of a vehicle;

discriminating that the vehicle is stopped if the vehicle speed is zero while an engine of the vehicle is running; and discriminating that the vehicle is parked if the engine revolution and vehicle speed are all zero.

9. The method as defined in claim 8, wherein an immediate warning is not raised but time is counted and warning is only given when the vehicle keeps stopping, if it is discriminated that the vehicle is stopped.

10. The method as defined in claim 7, wherein an immediate warning is not raised but time is counted and warning is only given when the vehicle keeps stopping, if it is discriminated that the vehicle is stopped.

11. The method as defined in claim 7, wherein the method further comprises a step of storing a record that a warning has been raised if there has occurred a warning.

12. The method as defined in claim 7, wherein the method further comprises a step of releasing a warning when the vehicle is moved out of the banned area by raising a warning to thereafter re-detect the position of the vehicle.

* * * * *